US008580027B1

(12) United States Patent
Campos et al.

(10) Patent No.: US 8,580,027 B1
(45) Date of Patent: Nov. 12, 2013

(54) SPRAYED ON SUPEROLEOPHOBIC SURFACE FORMULATIONS

(75) Inventors: Raymond Campos, Lancaster, CA (US); Andrew J. Guenthner, Lancaster, CA (US); Timothy S. Haddad, Lancaster, CA (US); Joseph M. Mabry, Lancaster, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 13/207,562

(22) Filed: Aug. 11, 2011

Related U.S. Application Data

(60) Provisional application No. 61/373,946, filed on Aug. 16, 2010.

(51) Int. Cl.
*C08K 9/08* (2006.01)
*C08K 9/06* (2006.01)

(52) U.S. Cl.
USPC ............... 106/287.27; 106/287.13; 523/213; 428/405

(58) Field of Classification Search
USPC ......... 523/213; 428/405; 106/287.13, 287, 27
See application file for complete search history.

(56) References Cited

U.S. PATENT DOCUMENTS

| 4,647,602 | A | 3/1987 | Wilczak et al. |
| 4,997,684 | A | 3/1991 | Franz et al. |
| 5,055,342 | A | 10/1991 | Markovich et al. |
| 5,194,326 | A | 3/1993 | Arthur et al. |
| 5,328,768 | A | 7/1994 | Goodwin |
| 5,357,025 | A | 10/1994 | Altes et al. |
| 5,523,162 | A | 6/1996 | Franz et al. |
| 5,607,744 | A | 3/1997 | Diener et al. |
| 5,674,967 | A | 10/1997 | Goodwin |
| 5,688,864 | A | 11/1997 | Goodwin |
| 5,693,365 | A | 12/1997 | Teranishi et al. |
| 5,997,621 | A | 12/1999 | Scholz et al. |
| 6,020,026 | A | 2/2000 | Birch et al. |
| 6,025,025 | A | 2/2000 | Bartrug et al. |
| 6,159,540 | A | 12/2000 | Menon et al. |
| 6,166,855 | A | 12/2000 | Ikeyama et al. |
| 6,172,139 | B1 | 1/2001 | Swei et al. |
| 6,318,124 | B1 | 11/2001 | Rutherford et al. |
| 6,383,642 | B1 | 5/2002 | Le Bellac et al. |
| 6,589,639 | B2 | 7/2003 | Farquhar et al. |
| 6,811,884 | B2 | 11/2004 | Goodwin et al. |
| 6,865,939 | B2 | 3/2005 | Kirby et al. |
| 7,013,965 | B2 | 3/2006 | Zhong et al. |
| 7,129,277 | B2 | 10/2006 | Baran, Jr. |
| 7,135,122 | B2 | 11/2006 | Park |
| 7,186,974 | B2 | 3/2007 | Tojo |
| 7,205,079 | B2 | 4/2007 | Wu et al. |
| 7,384,872 | B2 | 6/2008 | Hwang et al. |
| 7,455,911 | B2 | 11/2008 | Langen et al. |
| 7,514,494 | B2 | 4/2009 | Lechtenboehmer et al. |
| 7,527,870 | B2 | 5/2009 | Beger et al. |
| 2005/0069708 | A1 | 3/2005 | Isarov et al. |
| 2005/0113488 | A1 | 5/2005 | Isarov et al. |
| 2005/0123739 | A1* | 6/2005 | Chen-Yang et al. ....... 428/306.6 |
| 2009/0214809 | A1 | 8/2009 | Rohaut et al. |
| 2010/0233494 | A1* | 9/2010 | Moorlag et al. .............. 428/447 |
| 2011/0027709 | A1* | 2/2011 | Wu et al. ....................... 430/104 |

FOREIGN PATENT DOCUMENTS

DE     EP 0719743 A1     3/1996

OTHER PUBLICATIONS

Adam Steele, Inherently Superoleophobic Nanocomposite Coatings by Spray Atomization, American Chemical Society, Dec. 10, 2008, pp. 501-505.
Young-Ching Sheen, New Approach to Fabricate Extremely Superamphiphobic Surface Based on Fluorinated Silica Nanoparticles, Journal of Polymer Science: Part B Polymer Physics, vol. 46, 1984-1990, pp. 1984-1990.
Yan Liu, Silicon Surface Structure-Controlled Oleophobicity, Langmuir Article 2010 26(11), pp. 8908-8913.
Thierry Darmanin, JACS Articles, Molecular Design of Conductive Polymers to Modulate Superoleophobic Properties, American Chemical Society 2009, pp. 7928-7933.
Yuri Kazakevich, "Absorption Characterization of Oligo(dimethylsiloxane)-Modified Silicas: and Example of Highly Hydrophobic Surfaces with Non-aliphatic Architecture," American Chemical Society 2002, pp. 3117-3122.
Jan Genzer, "Molecular Orientation and Grafting Density in Semifluorinated Self-Assembled Monolayers of Mono-, Di-and Trichloro Silanes of Silica Substrates," American Chemical Society 2002, pp. 9307-9311.
Takash Monde, "Adsorption Characteristics of Silica Gels Treated with Fluorinated Silylation Agents," Journal of Colloid and Interface Science 1997, pp. 111-118.

(Continued)

*Primary Examiner* — Margaret Moore
(74) *Attorney, Agent, or Firm* — AFMCLO/JAZ; Rebecca Greendyke

(57) ABSTRACT

Fluoroalkylsilane-treated metal oxide particles and a fluoroelastomeric binder are dispersed in a fluorinated solvent with a low boiling point and applied to a substrate via spray deposition. The spray deposition process rapidly produces a conformal coating that features low surface energy and surface topography with a large range of characteristic length scales and re-entrant curvature, thereby imparting superoleophobicity. The degree of superoleophobicity is readily adjusted by means of altering the ratio of particles to binder. The choice of particle and binder result in coatings with thermal stability for thousands of hours at temperatures up to 200 degrees Celsius as well as desirable mechanical characteristics.

7 Claims, 3 Drawing Sheets

(56) References Cited

OTHER PUBLICATIONS

Alexander Fadeev, "Self-Assembly is Not the Only Reaction Possible between Alkyltrichlorosilanes and Surfaces: Monomolecular and Oligomeric Covalently Attached Layers of dichloro and Trichloroalkylsilanes on Silicon," American Chemical Society 2000, pp. 7268-7274.

Tuteja, A., et al., "Designing Superoleophobic Surfaces," Science, 2007, 318, 1618.

Tuteja, A., et al., "Robust Omniphobic Surfaces," Proc. Natl. Acad. Sci. U. S. A., 2008, 105, 18200.

Tuteja, A., et al., "Design Parameters for Superhydrophobicity and Superoleophobicity," MRS Bull., 2008, 33, 752.

Choi, W., et al., "Fabrics with Tunable Oleophobicity," Adv. Mater., 2009, 21, 2190.

Chhatre, S.S., et al., "Scale dependence of omniphobic mesh surfaces," Langmuir, 2010, 26, 4027.

Chhatre, S.S., et al., "Thermal Annealing Treatment to Achieve Switchable and Reversible Oleophobicity on Fabrics," Langmuir, 2009, 25, 13625.

Monde, T, et al., "Adsorption Characteristics of Silica Gels Treated with Fluorinated Silylation Agents", J. Colloid Interface Sci. 1997, 185, 111-118.

Chhatre, S.S., et al., "Fluoroalkylated Silicon-Containing Surfaces-Estimation of Solid-Surface Energy," App Mat Int, vol. 2, No. 12, 3544-3554 (2010).

Campos, R., et al., "Toward Mechanically-Robust Omniphobic Composite Coatings Using Fluoroalkyl-Modified Silica," Polymer Preprints, 2009, 50(2), 717.

\* cited by examiner

SPRAYED ON SUPEROLEOPHOBIC SURFACE FORMULATIONS

CROSS REFERENCE TO RELATED APPLICATION

This application claims the benefit of U.S. provisional application Ser. No. 61/373,946 filed on Aug. 16, 2010.

STATEMENT OF GOVERNMENT INTEREST

The invention described herein may be manufactured and used by or for the Government for governmental purposes without the payment of any royalty thereon.

FIELD OF THE INVENTION

This invention relates to sprayed-on coatings and formulations thereof that impart extreme resistance to wetting by fuels, oils, and greases.

BACKGROUND OF THE INVENTION

The present invention is intended to impart durable superoleophobic characteristics to a wide variety of metal, ceramic, or polymeric substrates by a rapid and simple process.

Fuels, oils, and greases typically possess a surface tension of 20-35 mJ per square meter, which is lower than almost all solid surfaces in which these fluids are in contact. Thus, fuels, oils, and greases tend to spread on almost all types of surfaces. Even when fuels, oils, and greases do not spread on surfaces, they can be difficult to remove due to the adhesion of individual liquid droplets. However, surfaces having a sufficiently low energy combined with the appropriate geometric texture involving re-entrant curvature or roughness at multiple (small) length scales can minimize the adhesion by forming composite liquid/air interfaces in contact with the surface. In such interfaces, only a portion of the solid surface is in direct contact with the liquid; the rest of the solid surface is covered by pockets of air or vapor. The partial nature of the solid/liquid contact reduces the force of adhesion and is most conveniently demonstrated by measuring the amount of vertical tilt needed to cause a droplet to roll off the surface rather than adhere. In conventional rough surfaces that are resistant to the spreading of fuels, oils, and greases, these angles tend to be large, however, when a composite interface is present, a tilt angle of less than about 20 degrees, is sufficient to cause droplets to roll off. When a surface tends to form composite air/liquid interfaces with fuels, oils, and greases, characterized by very high contact angles (often over 120 degrees), with only a small difference between advancing and receding contact angles, and with roll-off angles less than about 20 degrees, the surface is said to be "superoleophobic". Although the phenomenon of superoleophobicity has been described for many decades, it is only since about 2007 that a significant amount of attention has been paid to it. As a result, there is as yet no commonly accepted precise definition of "superoleophobic", though the working definition as noted above suffices for most practical situations.

Superoleophobic surfaces are in general extremely rare and thus far unknown in nature, though surfaces exhibiting analogous behavior towards water, known as "superhydrophobic" surfaces, are widely known. Despite the rarity of superoleophobic surfaces, the easy cleaning and resistance to spreading by fuels, oils, and greases imparted by superoleophobicity represents a highly desirable property for many surfaces, not only for items such as engine components, fuel system components, and transparencies found in military applications, but for a number of items in widespread use such as touchscreen displays, food handling equipment, and clothing. There is thus a widespread need for superoleophobic surface technology; in particular, there is a need for a coating formulation that, when applied to any underlying surface by a simple method, imparts superoleophobicity, and remains intact after exposure to elevated temperatures. There is a further need for such a coating to be readily prepared in a variety of different formulations having a controlled and easily tuned degree of superoleophobicity in concert with a controlled and easily tuned degree of hardness, durability, and optical characteristics. Such a coating can be said to exhibit "robustly designed superoleophobicity" in the sense that industrial product designers have the freedom to alter the formulation in simple ways without destroying the superoleophobic character of the surface, and that a small change in any given formulation variable can be expected to lead to a small change in the degree of superoleophobicity, which may be determined by the range of fluids that will form composite interfaces, or more quantitatively, by the lowest surface tension that a liquid can possess and still form a composite interface.

As mentioned, the known examples of superoleophobic surfaces are few. For instance, complex processes such as chemical vapor deposition, electrodeposition, lithography, etching, electrospinning, or sol-gel processing have been used to fabricate such surfaces (U.S. Pat. No. 7,455,911; U.S. Pat. No. 6,383,642; A. Tuteja, W. Choi, M. Ma, J. M. Mabry, S. A. Mazzella, G. C. Rutledge, G. H. McKinley and R. E. Cohen, Science, 2007, 318, 1618; A. Tuteja, W. Choi, J. M. Mabry, G. H. McKinley and R. E. Cohen, Proc. Natl. Acad. Sci. U.S.A., 2008, 105, 18200; A. Tuteja, W. Choi, G. H. McKinley, R. E. Cohen and M. F. Rubner, MRS Bull., 2008, 33, 752; T. Darmanin and F. Guittard, J. Am. Chem. Soc., 2009, 131, 7928; Y. Liu, Y. Xiu, D. W. Hess, and C. P. Wong, Langmuir, 2010, 26, 8908). Such processes, however, do not allow for the facile coating of a wide variety of substrates.

Simpler processes, such as dip coating, have been used to impart superoleophobic behavior to common fabrics and biological surfaces (W. Choi, A. Tuteja, S. Chhatre, J. M. Mabry, R. E. Cohen and G. H. McKinley, Adv. Mater., 2009, 21, 2190; S. S. Chhatre, W. Choi, A. Tuteja, K.-C. Park, J. M. Mabry, G. H. McKinley and R. E. Cohen, Langmuir, 2010, 26, 4027; S. S. Chhatre, A. Tuteja, W. Choi, A. Revaux, D. Smith, J. M. Mabry, G. H. McKinley and R. E. Cohen, Langmuir, 2009, 25, 13625). The coatings, however, are easily removed on contact with any liquid and can only impart superoleophobicity to substrates with specific pre-existing textures. Spin coating has also been used to form fragile superoleophobic surfaces (Y. C. Sheen, Y. C. Huang, C. S. Liao, H. Y. Chou, and F. C. Chang, J. Polym. Sci. Polym. Phys. Ed., 2008, 46, 1984), but again the range of substrates that can be rendered superoleophobic via this technique is limited.

Despite its simplicity and applicability to any substrate, spray coating has not yet been widely used to create superoleophobic surfaces. In the lone published instance where it has been employed (A. Steele, I. Bayer and E. Loth, Nano Lett., 2009, 9, 501), the conditions leading to superoleophobicity were extremely narrowly defined, precluding "robustly designed" coatings, and the maximum use temperature of the fluoro-acrylate materials employed was limited to about 125° C. The present invention, however, relates to a spray coated superoleophobic surface that survives exposure to temperatures as high as 200° C. and that possesses "robustly designed" superoleophobicity due to the gradual alteration of its ability to form composite interfaces with changes in composition.

SUMMARY OF THE INVENTION

Broadly, the present invention comprises a mixture of fluoroalkylsilane-treated mesoporous inorganic metal oxide aggregates having low surface energy, a fluoroelastomer having low surface energy, and a low viscosity fluorinated solvent with a boiling point of 30-200° C. and low surface energy, with the ability to be spray coated onto any substrate, and a coating formed by spraying the mixture on a surface that can survive extended exposure to temperatures as high as 200° C. and that imparts "robustly designed" superoleophobocity.

DETAILED DESCRIPTION OF THE INVENTION

Figure 1A:
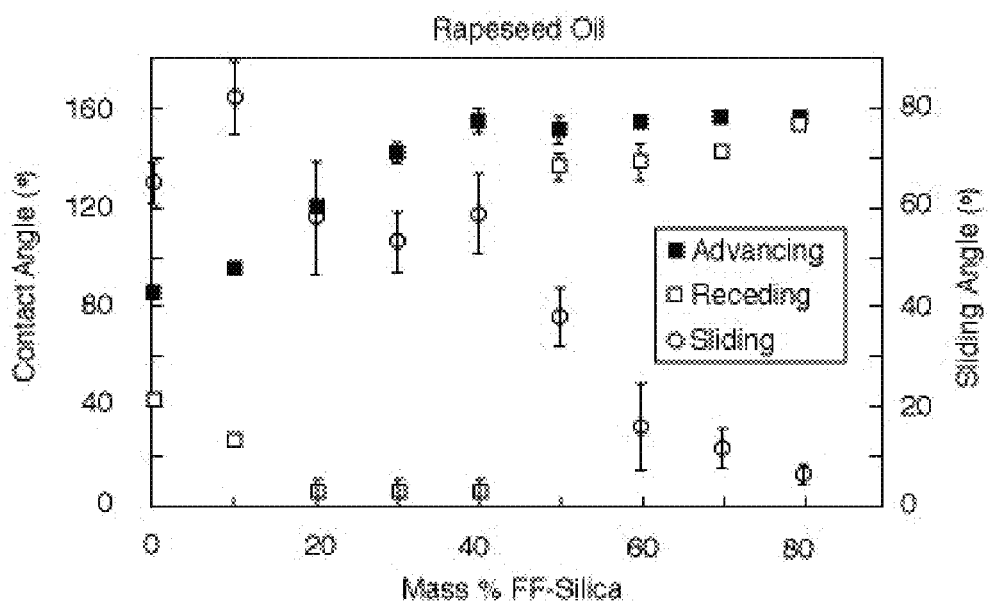
FIG. 1 shows the advancing, receding, and sliding angles measured from coating formulations having a variable ratio of treated silica to fluoroelastomer

In one embodiment, the coating formulation of the present invention comprise:

a) mesoporous fluoroalkylsilane-treated inorganic metal oxide aggregates having at least 15 parts fluorine in the form of —$CF_2$— and —$CF_3$ terminal fragments per 100 parts metal oxide by weight, and having a size distribution substantially within the range 0.1 μm to 20 μm, with the primary particles of the aggregate having a size distribution substantially below 50 nm;

b) a fluoroelastomeric binder having a service life greater than 1000 hours at a temperature higher than 125° C.; and c) a fluorinated solvent having a boiling point of 30-200° C. and a viscosity at 20° C. of 0.0001 Pa s to 10 Pa s and existing in a readily homogenized (at millimeter scale) form, capable of being sprayed on to any surface of millimeter-scale extent or larger and forming a solid coating substantially free of millimeter-scale or larger defects.

In another embodiment, the coating formulation is a sprayed-on coating, comprising:

a) a fluoroalkylsilane-treated inorganic metal oxide particles having at least 15 parts fluorine in the form of —$CF_2$— and —$CF_3$ terminal fragments per 100 parts metal oxide by weight on average, and having a size distribution substantially below 50 nm; and b) a fluoroelastomeric binder.

Wherein, the sprayed-on coating described above has topological features with characteristics that are adjustable by means of altering the ratio of the particles to the binder, such that topographical features at multiple length scales within the range 10 nm to 0.1 mm exist, with at least a portion of such features having re-entrant curvature, and such that as the ratio of particles to binder increases, the density of features with re-entrant curvature at smaller length scales gradually increases due to depletion of excess binder that when present, provides a smooth covering over said features.

In preferred embodiments, the formulation to be spray coated contains fluoroalkyl-alkylsilane-treated inorganic metal oxide aggregates. An example is Hi-Sil 233 precipitated silica treated with heptadecafluoro(1,1,2,2-tetrahydro) decyldimethylchlorosilane in a manner that provides a grafting density of at least one covalently grafted fluoroalkyl chain per square nanometer. The fluoroalkylation of the aggregate surfaces is needed to provide good dispersion and adhesion with the other formulation ingredients, which are also fluorinated.

In preferred embodiments, the metal oxide aggregates are mesoporous and exhibit a specific surface area of at least 50 square meters per gram. An example of a mesoporous metal oxide is Aerosil 380 fumed silica. The mesoporosity allows for interpenetration of the fluoroelastomer. At high metal oxide loadings, nearly all of the fluoroelastomer molecular chains will penetrate one or more aggregates, binding them together when spray coated and dried. At lower loadings, excess fluoroelastomer discourages tight binding of particles and accumulates on the outer surfaces of the aggregates and on any bare regions of the article to be coated, after spraying and drying. Thus, the roughness of the aggregates changes character gradually, from high roughness at micron to sub-micron length scales on most of the outer surfaces of the aggregates at high metal oxide loadings, to high roughness at micron to sub-micron length scales only on a small portion of the aggregate outer surfaces at low metal oxide loadings. Since it is well-known that the form of roughness associated with mesoporosity of hierarchical aggregates, which features re-entrant curvature at sub-micron length scales, is highly beneficial for imparting superoleophobicity, the gradual change in the topographical character of the coating, wherein the density of features with re-entrant curvature at comparatively small length scales increases gradually as the loading of metal oxide increases, is one factor that leads to gradual changes in the degree of superoleophobicity.

In preferred embodiments, the coating formulation contains a fluoroelastomer having a well-established resistance to extended exposure to temperatures as high as 200° C. An example of such a fluoroelastomer is Viton Extreme ETP 600S, which can survive for over 10,000 hours at 200° C. according to the manufacturer's technical data. The elastomeric nature of the material provides enhanced durability by resisting brittle failure during handling, which would otherwise occur readily in sprayed coatings containing only inorganic particles. The treated metal oxide particles generally exhibit less than 5% weight loss at temperatures up to 300° C., thus the thermal stability of the coating after spraying and drying will be determined by the thermal stability of the elastomeric binder used.

In embodiments, a variable amount of treated aggregates and fluoroelastomer are mixed in a fluorinated solvent having a boiling point between 30 and 200° C. The ratio of aggregates to fluoroelastomer may vary from 1 part aggregates to 4 parts fluoroelastomer by weight up to 4 parts aggregates per 1 part fluoroelastomer by weight. It is this ratio that primarily determines the degree of superoleophobicity of the sprayed-on coating. The total content of solids in the coating formulation may vary but is generally less than 30 g per liter. The boiling point range of the solvent facilitates the use of spraying by allowing for very rapid drying of the coating as soon as it is applied, since a large amount of fluid flow after application will create large-scale defects that compromise superoleophobic performance and durability. The viscosity of the mixed formulation prior to spraying, however, must be sufficiently low to permit the use of spray equipment. Dispersion of the coating formulation ingredients into a mixture that is homogeneous on the scale of a sprayed fluid droplet (millimeter scale) is accomplished by vigorous stirring for a few minutes.

In embodiments, the coating formulation is sprayed onto any substrate. However, as is well-known to those skilled in the art, the method of preparing the substrate including cleaning procedures and the use of commercially available surface pre-treatments, is of importance in determining the degree of adhesion between the coating and the substrate. Generally, on clean and smooth surfaces the adhesion and cohesion of the coating will be sufficient to provide for normal handling in a quiescent environment without mechanical failure. The coating thickness may be varied according to the desired mechanical characteristics of the coating as well as the roughness of the substrate, in such a manner as will be apparent to those skilled in the art of spray coating. For flat surfaces such as glass plates, a coating level of 20 g per square meter will be sufficient to provide reproducible superoleophobicity and mechanical integrity.

In preferred embodiments, a final drying step is performed after spraying to remove any residual solvents. The times, temperatures, and atmospheric compositions under which drying take place may vary according to the evaporation characteristics of the solvent used and the geometry and composition of the substrate and the sprayed coating, and are readily established by those skilled in the art. For the fluorinated solvent Asahiklin AK225G, drying at 60° C. overnight in an ambient atmosphere is sufficient to remove all traces of solvent from coated silicon wafers approximately 2" in diameter and a coating weight of 20 g per square meter.

In embodiments, the ratio of aggregate to fluoroelastomer is varied to provide the desired level of superoleophobicity. For instance, if a ratio of 50 parts by weight aggregates to 50 parts by weight fluoroelastomer is required to obtain a composite interface when in contact with rapeseed oil, which has a surface tension of 35.5 mJ per square meter, a ratio of 60 parts by weight aggregates to 40 parts by weight fluoroelastomer will be required to form a composite interface when in contact with hexadecane, which has a surface tension of 27.5 mJ per square meter, and a ratio of 70 parts by weight aggregates to 30 parts by weight fluoroelastomer will be required to sustain a composite interface when in contact with dodecane, which has a surface tension of 25.3 mJ per square meter. In general, for non-polar fluids in contact with the coating, and in the absence of specifically interacting chemical functionalities included in the formulation, there will be a simple, monotonic, and gradually changing relationship between the composition and the minimum surface tension of a liquid in contact that will sustain a composite interface. Such a feature is the key to "robustly designed"" superoleophobicity, since it allows the coating formulator to choose the desired degree of superoleophobicity via a straightforward weight ratio of ingredients.

It will be apparent to those skilled in the art of selecting ratios of ingredients for coating formulations that the ratio of aggregates to fluoroelastomer will affect more than just the degree of superoleophobicity. For instance, the resistance of the coating to brittle failure will decrease as the amount of fluoroelastomer in the formulation decreases. Hence, in most instances, it is expected that it will not be the case that the highest possible ratio of aggregates to fluoroelastomer will be chosen. Moreover, it is reasonable to expect that a coating formulator will wish to alter the ratio of ingredients from time to time due to changes in performance requirements or application environments. In such cases, the "robustly designed" superoleophobicity of the invention is of great practical value. In contrast, coating systems that display superoleophobicity over only a narrow range of compositions, or in which the degree of superoleophobicity changes drastically with small changes in composition, will create severe difficulties in practical scenarios. Such difficulties will greatly increase the time and cost needed to successfully utilize such coatings, and are conveniently avoided by the present invention.

The following examples provide an explanation and illustration of the features of the embodiments.

Example 1

Hi-Sil 233, a precipitated silica with a primary solid particle diameter of 22 nm and a specific surface area (as determined by the BET nitrogen adsorption profile) of approximately 125 $m^2/g$, was purchased from PPG Industries. Heptadecafluoro-1,1,2,2-tetrahydrodecyl)dimethylchlorosilane (FDec-MCS) was purchased from Gelest, Inc. and used as received without further purification. Anhydrous dimethylamine was purchased from Aldrich. Chloroform was purchased from Aldrich and passed through an activated alumina column to remove water. Deionized water was further purified using a Millipore system.

The surface functionalization of silica particles was performed using various Schlenk line techniques, taking great care to minimize moisture exposure. Hi-Sil 233, typically on a 2 g scale, was initially dried by heating overnight at 200° C. under dynamic vacuum. The dried silica was allowed to cool to room temperature under vacuum before one atmosphere of dimethylamine gas was introduced. The silica particles were then suspended in chloroform and a four-fold excess on a molar basis of FDec-MCS was added via syringe (assuming a maximum grafting density of 4 $\mu mol/m^2$ or 2.4 $chains/nm^2$). The reaction mixture was allowed to stir for three days in a nitrogen environment. The fluoroalkyl functionalized silica particles were recovered by centrifuge and purified by chloroform Soxhlet extraction. The Soxhlet extraction was allowed to proceed for three days in a nitrogen environment. After the extraction process, the particles were dried with a stream of nitrogen, transferred to vials, and dried at 100° C. under dynamic vacuum for approximately one hour.

To form the spraying solution, the fluoroalkylsilane-treated silica particles were dispersed at 20 mg/mL in the fluorinated hydrocarbon solvent AK225G (a 1,1,2,2,3-Pentafluoro-1,3-dichloropropane) obtained from Asahi Glass Co., along with 5 mg/mL of Viton Extreme ETP-600S (a terpolymer consisting of ethylene, tetrafluoroethylene, perfluoro(methylvinyl) ether, and bromotetrafluorobutene) supplied by DuPont. Dispersion was achieved by vigorous stirring. The dispersion was spray coated onto glass microscope slides at an approximate loading level of 0.02 $mg/mm^2$ using a Paasche VLST-PRO Airbrush (siphon fed, internal mix, 1.07 mm tip opening), and allowed to dry for a few seconds at ambient temperature, after which superhydrophobic behavior was observed. A post-drying bake out at 60° C. overnight was used to ensure complete removal of all AK225G.

Dynamic contact angles experiments were conducted on a Dataphysics OCA20 goniometer equipped with a TBU90 tilting stage. Experiments consisted of placing a 3 µL drop of probing liquid onto a test substrate, adding an additional 2 µL through a dispensing needle at a rate of 0.2 µL/sec, and then removing 3 µL at 0.2 µL/sec. Consecutive frames (20-100) of experiment video during the addition and removal of probing liquid, where constant advancement or recession of the contact line was observed, were used to measure the advancing and receding contact angles, respectively. Measurements were made from a "tangent lean" fit using Dataphysics droplet fitting software. The average from 3-5 dynamic contact angle experiments were used to report advancing and receding contact angles. Sliding angles were measured by first dispensing a 10 µL droplet onto a test substrate and then tilting the sample stage at a rate of until the droplet slid off of the substrate. Frames of experiment video immediately after droplet motion along with Dataphysics software were used to determine the sliding angle. The average of 3-5 sliding angle measurements are reported herein.

Figure 1B:
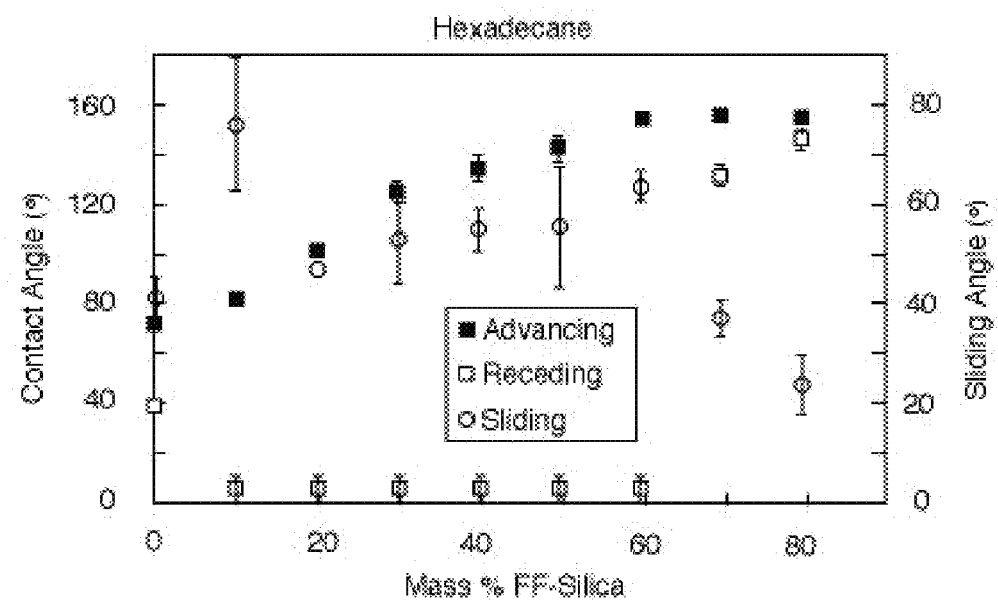

FIG. 1 provides the advancing, receding, and sliding angles that were measured from samples prepared as described above, but with a variable ratio of treated silica to fluoroelastomer, reported as the mass fraction of treated silica in the dried coating. For rapeseed oil, a transition to a superoleophobic state was evident for mass fractions above 50%, while for hexadecane superoleophobic behavior was found beginning at 70-80%. The gradual change in the mass fraction needed to attain superoleophobic behavior provided definitive evidence of "robustly designed" superoleophobicity.

Example 2

Figure 2:
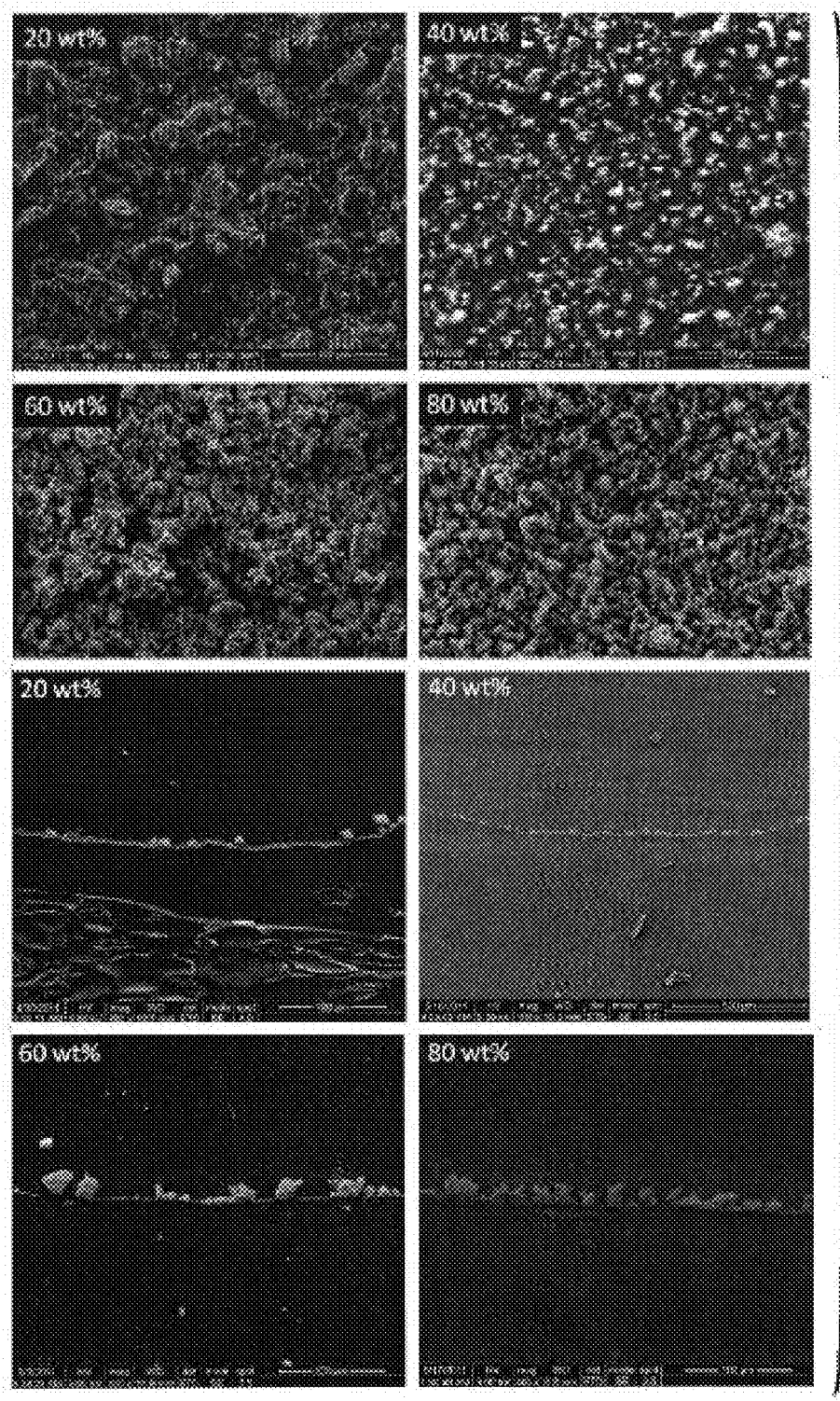
FIG. 2 is SEM images of coating formulations having a variable ratio of treated silica to fluoroelastomer

FIG. 2 shows top-down and cross-sectional SEM images obtained of the samples prepared according to the description given in Example 1. The images showed a gradual change in the morphology of the coating, from smoothed aggregates coated in fluoroelastomer at 20% to aggregates partially coated at 40% to rough aggregates cemented together by binder at 60% and 80%. The gradual changes in topology formed the basis for the gradual change in the degree of superoleophobocity observed for the coatings.

Example 3

Figure 3:
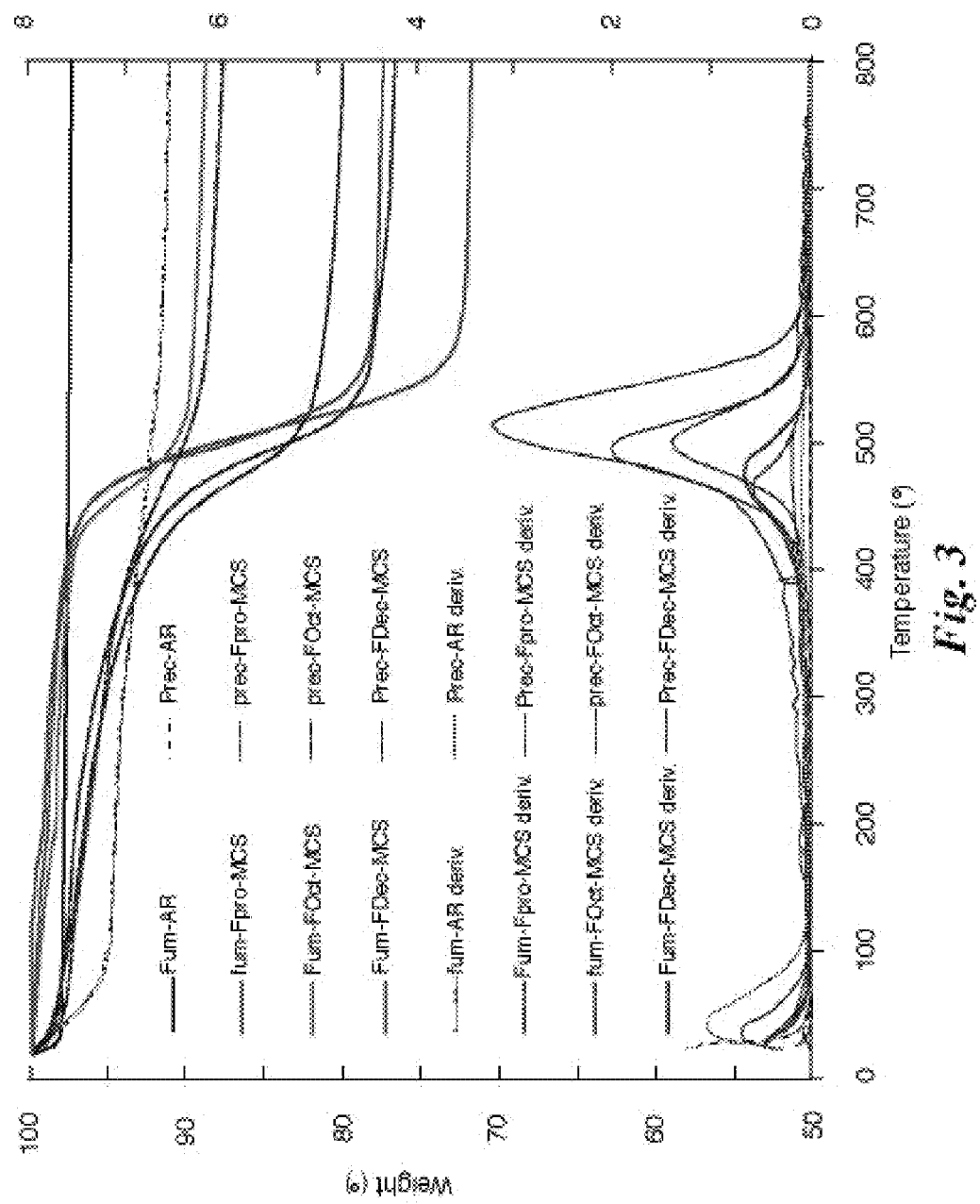
FIG. 3 is a thermogravimetric analysis of treated fumed silica and precipitated silica as modified by the FDec-MCS

FIG. 3 shows a thermogravimetric analysis of treated fumed (Aerosil 380) silica and precipitated silica (Hi-Sil 233) as modified by the FDec-MCS as described in Example 1. The Hi-Sil 233 sample in particular showed negligible weight loss below 200° C.; thus, the thermal stability of the treated Hi-Sil 233 particles was found to be as great or greater than that of the Viton Extreme fluoroelastomer (10,000 hours at 200° C. according to the manufacturer's data sheet). As a result, the coating could be expected to withstand thousands of hours of exposure at temperatures as high as 200° C., significantly exceeding the maximum use temperatures of all previously reported sprayed-on superoleophobic coatings.

What is claimed is:

1. A coating formulation comprising:
   a) a first portion comprising a plurality of mesoporous fluoroalkylsilane-treated inorganic metal oxide aggregates, each of the aggregates of the plurality having at least 15 parts fluorine in the form of —$CF_2$— and —$CF_3$ terminal fragments per 100 parts metal oxide by weight, and having a size distribution within the range of 0.1 μm to 20 μm,
   b) a second portion comprising a fluoroelastomeric binder; and
   c) a fluorinated solvent having the first portion of the plurality of mesoporous fluoroalkylsilane-treated inorganic metal oxide aggregates and the second portion of the fluoroelastomeric binder dispersed therein, wherein the fluorinated solvent has a boiling point between 30° C. and 200° C. and a viscosity at 20° C. of 0.0001 Pa·s to 10 Pa·s;
   wherein the coating formulation is configured to be sprayed on to a surface and forming a solid coating in which at least a portion of the fluoroelastomeric binder binds to at least one of the plurality of mesoporous fluoroalkylsilane-treated inorganic metal oxide aggregates, and
   a ratio of the first portion to the second portion determines a resultant surface roughness of the solid coating.

2. The coating formulation of claim 1, wherein the plurality of mesoporous fluoroalkylsilane-treated inorganic metal oxide aggregates is precipitated silica or fumed silica.

3. The coating formulation of claim 2, wherein each of the plurality of mesoporous fluoroalkylsilane-treated inorganic metal oxide aggregates include at least one covalently grafted fluoroalkyl chain per square nanometer.

4. The coating formulation of claim 1, wherein the fluoroelastomer is a terpolymer of ethylene, tetrafluoroethylene, perfluoro(methylvinyl)ether, and bromotetrafluorobutene.

5. The coating formulation of claim 2, wherein the fluorinated solvent is 1,1,2,2,3-pentafluoro-1,3-dichloropropane.

6. A sprayed-on coating, comprising a plurality of:
   a) a mesoporous aggregate of fluoroalkylsilane-treated inorganic metal oxide particles, the fluoroalkylsilane-treated inorganic metal oxide particles having at least 15 parts fluorine in the form of —$CF_2$— and —$CF_3$ terminal fragments per 100 parts metal oxide by weight and having a size distribution below 50 nm; and
   b) a fluoroelastomeric binder, wherein the sprayed-on coating has topographical character selected by a ratio of the mesoporous aggregate to the fluoroelastomeric binder.

7. The coating formulation of claim 1, wherein the fluoroelastomeric binder binds to at least two of the plurality of mesoporous fluoroalkylsilane-treated inorganic metal oxide aggregates.

* * * * *